(12) United States Patent
Drescher

(10) Patent No.: US 11,775,744 B2
(45) Date of Patent: *Oct. 3, 2023

(54) SYSTEMS AND METHODS FOR ON-IMAGE NAVIGATION AND DIRECT IMAGE-TO-DATA STORAGE TABLE DATA CAPTURE

(71) Applicant: Open Text SA ULC, Halifax (CA)

(72) Inventor: Michael Drescher, Allensbach (DE)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,129

(22) Filed: Dec. 5, 2022

(65) Prior Publication Data

US 2023/0115613 A1    Apr. 13, 2023

Related U.S. Application Data

(63) Continuation of application No. 16/399,284, filed on Apr. 30, 2019, now Pat. No. 11,543,943.

(51) Int. Cl.
| | |
|---|---|
| *G06F 40/174* | (2020.01) |
| *G06F 3/0484* | (2022.01) |
| *G06F 3/0482* | (2013.01) |
| *G06V 30/412* | (2022.01) |
| *G06V 30/416* | (2022.01) |
| *G06V 30/413* | (2022.01) |
| *G06V 30/10* | (2022.01) |

(52) U.S. Cl.
CPC .......... *G06F 40/174* (2020.01); *G06F 3/0482* (2013.01); *G06F 3/0484* (2013.01); *G06V 30/412* (2022.01); *G06V 30/413* (2022.01); *G06V 30/416* (2022.01); *G06V 30/10* (2022.01)

(58) Field of Classification Search
CPC .... G06F 3/0484; G06F 3/0482; G06F 40/174; G06V 30/412; G06V 30/416; G06V 30/10
See application file for complete search history.

(56) References Cited

U.S. PATENT DOCUMENTS

| | | | |
|---|---|---|---|
| 8,270,721 B2* | 9/2012 | Schiehlen | G06V 10/987 382/284 |
| 10,241,992 B1* | 3/2019 | Middendorf | G06F 40/177 |
| 2004/0181749 A1* | 9/2004 | Chellapilla | G06F 40/174 715/222 |

(Continued)

*Primary Examiner* — Tan H Tran
(74) *Attorney, Agent, or Firm* — Sprinkle IP Law Group

(57) ABSTRACT

An on-image navigation guide can be generated utilizing coordinates of table data of a table in a document image. The on-image navigation guide enables a user to populate a data entry form with the table data by interacting directly with the document image. The data entry form is configured with the same number of columns as the table and the document image and the data entry form share the same data structure. The on-image navigation guide is presented on top of the document image. As a user navigates the document image, a focus point of the on-image navigation guide moves from table cell to table cell, providing an immediate visual feedback on what is captured in a corresponding data entry field. The on-image navigation guide includes an on-image context menu and a pin through which the user can make adjustments and/or corrections without leaving the document image.

20 Claims, 18 Drawing Sheets

(56) References Cited

U.S. PATENT DOCUMENTS

| | | | |
|---|---|---|---|
| 2005/0044496 A1* | 2/2005 | Kotler | G06F 40/103 |
| | | | 715/267 |
| 2010/0011308 A1* | 1/2010 | Shaw | G06F 40/166 |
| | | | 715/765 |
| 2014/0258838 A1* | 9/2014 | Evers | G06F 40/174 |
| | | | 715/234 |
| 2016/0335494 A1* | 11/2016 | Ho | G06F 40/226 |
| 2017/0154022 A1* | 6/2017 | Wang | G06F 3/0482 |
| 2020/0104586 A1* | 4/2020 | Takahashi | G06V 30/32 |
| 2020/0142862 A1* | 5/2020 | Lopez Ruiz | G06F 40/174 |

* cited by examiner

SYSTEMS AND METHODS FOR ON-IMAGE NAVIGATION AND DIRECT IMAGE-TO-DATA STORAGE TABLE DATA CAPTURE

CROSS-REFERENCE TO RELATED APPLICATIONS

This is a continuation of, and claims a benefit of priority under 35 U.S.C. § 120 from, U.S. patent application Ser. No. 16/399,284, filed Apr. 30, 2019, entitled "SYSTEMS AND METHODS FOR ON-IMAGE NAVIGATION AND DIRECT IMAGE-TO-DATA STORAGE TABLE DATA CAPTURE," issued as U.S. Pat. No. 11,543,943, which is fully incorporated by reference herein.

TECHNICAL FIELD

This disclosure relates generally to image analysis and feature extraction. More particularly, this disclosure relates to systems and methods for on-image navigation and direct image-to-data storage table data capture.

BACKGROUND OF THE RELATED ART

Image analysis and feature extraction technologies have come a long way. U.S. Pat. No. 8,270,721 describes a variety of methods and systems for acquiring data from machine-readable documents and provides a new solution for acquiring table data from machine-readable documents. In U.S. Pat. No. 8,270,721, individual data are extracted from a document, as automatically as possible, and are entered into corresponding database fields. When data cannot be extracted from the document with a desired degree of reliability for particular database fields, the document is displayed with the database fields for which the data cannot be extracted. A proposal routine is executed so that string sections, in a vicinity of a pointer movable by a user on the display screen, are selected, marked, and proposed for extraction. In this way, the user is informed of the database field for which the data must still be extracted from the document shown on the display screen and can then transfer or incorporate the proposed string section into the database field by actuating a particular key.

This approach requires that the user interacts with the document as well as the data fields shown on the display screen. Since the user has to move a cursor or pointing device back and forth between the document and the data fields on the display screen and manually actuate keys, the loss of efficiency and time can be significant. This is particularly a concern when the document containing table data to be extracted might be huge. For instance, an entity's invoice to another entity can be several pages long, with hundreds of line items (e.g., 400 plus line items on 20 plus pages). It can be extremely difficult to synch table data from such a document to the data fields of a data storage file without any error. Accordingly, a user likely will need to scroll back and forth on the document and the data entry form and perform numerous keystrokes to enter and/or correct the values in the data fields.

SUMMARY OF THE DISCLOSURE

An object of the invention is to eliminate or minimize the need for a user to interact with an data entry form when table data is captured from a document image. In embodiments disclosed herein, this object is realized in systems and methods for on-image navigation and direct image-to-data storage table data capture. Embodiments of the on-image navigation and direct image-to-data storage table data capture disclosed herein can be implemented on a document recognition and data processing platform operating in a network computing environment.

Heterogeneous documents may be received, through various applications running on disparate sources, by the document recognition and data processing platform. These documents are often in an image file that may or may not contain coded text. A recognition process or function may be applied to obtain the coded text. The recognition process or function can be configured to provide coordinates of text found in the image.

In some embodiments, a method can include receiving or obtaining the coordinates of table data of a table in a document image and generating an on-image navigation guide using the coordinates of the table data found in the document image. To capture the table data, an entry form can be configured to have the same number of columns as the table. The form, the document image, and the on-image navigation guide are presented on a display screen, with the on-image navigation guide overlaying the document image on the display screen. The on-image navigation guide has a focus point that corresponds to a table cell on the document image. The focus point represents an intersection of the vertical lines and the horizontal lines of the on-image navigation guide. Additionally, the on-image navigation guide has an on-image context menu, a pin, and/or an inspection window. The on-image context menu of the on-image navigation guide overlaying the document image allows a user to edit the data without having to interact with the entry form. The pin is a helper for capturing data outside the current focus point. The inspection window provides a visual feedback of what is captured in a corresponding data field. The inspection window includes an input field that can be activated to enable manual entry of a correction or replacement for the value in the corresponding data field without the user ever leaving the document image.

In some embodiments, the pin serves as a toggle for the system to fix the current position of the on-image navigation guide. When fixed, any mouse movement will not change the current row and column displayed. The current cell, which is the intersection of the row and column, is fixed this way. This will allow the user to capture a value even outside this intersection for this particular cell. As soon as a value is captured, the fix is released.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
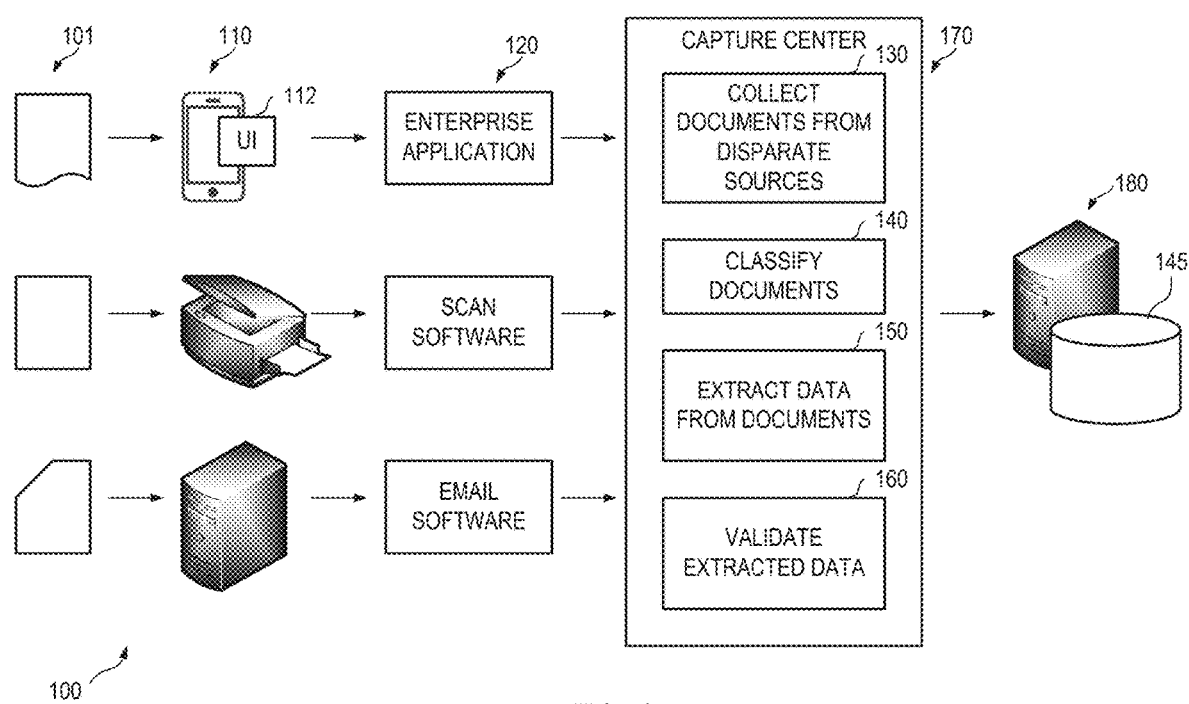
FIG. 1 depicts a diagrammatic representation of a network computing environment where embodiments disclosed herein can be implemented.

FIG. 1 depicts a diagrammatic representation of a network computing environment 100 where embodiments disclosed herein can be implemented. As illustrated in FIG. 1, heterogeneous documents 101 may be received, through applications 120 running on disparate sources 110, by a document recognition and data processing platform 170.

Platform 170 may include a plurality of subsystems (e.g., subsystems 130, 140, 150, 160) configured for providing advanced document and character recognition capabilities for processing documents 101 into machine-readable information that can be stored in a data store and used by any subsequent computing facility, represented by an enterprise server 180 in FIG. 1. Non-limiting examples of subsequent computing facilities can include, but are not limited to, content servers, archive servers, case management systems, customer relation management systems, record management systems, invoice management systems, etc. Server 180, therefore, is representative of an export target which has its own data store 145.

Generally, subsystem 130 is configured for collecting or receiving documents 101 from disparate sources 110 (e.g., through software applications 120). Documents 101 can include invoices, purchase orders, debit notes, credit notes, delivery notes, and so on. Where applicable (e.g., when documents received are actually scanned images), subsystem 130 can separate or split a batch of images into individual (e.g., multi-page) documents. When documents 101 do not already contain coded text, subsystem 130 can run an optical character recognition (OCR) function to transform pixels into characters (coded text).

Subsystem 140 is configured for classifying these documents. The classification may entail examining a document and determining a document type (e.g., .invoice, .delivery note, .order, .other, etc.) for the document. Each document type may be characterized by a set of features (e.g., size, logos, characteristic text, and so on).

Subsystem 150 is configured for extracting data from the documents thus classified. The data exaction, which may be performed depending upon the document type, may entail searching for certain features in a document that correspond to the document type. For example, if a document is classified as an invoice type and the invoice type is associated with a set of features such as date, amount, order number, and supplier, subsystem 150 may operate to search the document for date, amount, order number, and supplier and extract these features from the document.

Subsystems 130-150 can automatically generate data and store it in a temporary data store. While subsystems 130-150 perform automatic processes, subsystem 160 is configured to validate the extracted data and/or manually key in missing data. The interpretation by subsystem 160, as well as the preceding 150, can include data manipulation and transformation. As a non-limiting example, suppose the date feature extracted from the document is textual information in the form of "Month Day, Year" (e.g., "Apr. 20, 2019"). Subsystem 160 can transform this textual information into a numerical form (e.g., "04202019"). As another example, suppose the supplier feature extracted from the document is textual information bearing the actual name of a supplier. Subsystem 160 can search a supplier database, find a supplier identifier associated with that name, and store the supplier identifier in its data store as part of the extracted data.

In some embodiments, subsystem 160 includes a new on-image navigation capability. In some embodiments, the new on-image navigation capability can be made available through a user interface 112 of an enterprise application 120 that functions as client software of platform 170. As discussed below and illustrated in FIG. 2, the new on-image navigation capability enables table data contained in a document to be captured into a data store directly from an image of the document.

Figure 2:
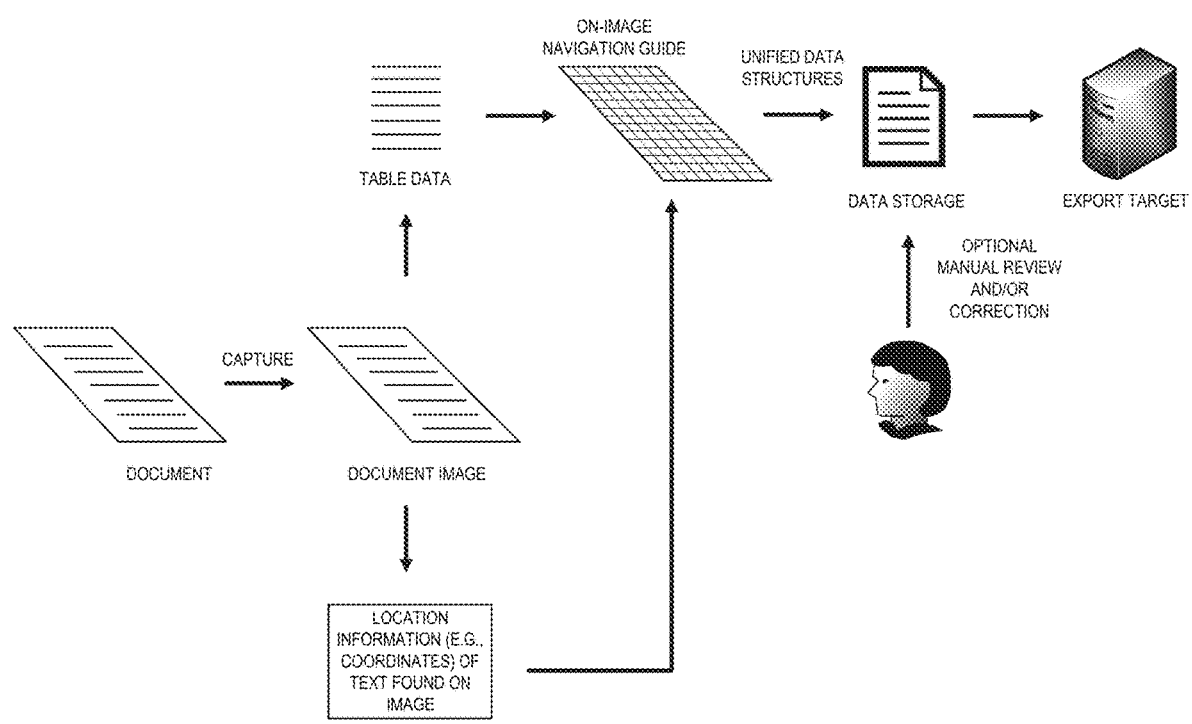
FIG. 2 depicts a flow diagram illustrating an example of a method of on-image navigation and direct image-to-data storage table data capture according to some embodiments.

Referring to FIG. 2, when a document (e.g., document 101) is captured electronically (e.g., by subsystem 130 of platform 170 through application 120), it can be in the form of a digital file. This digital file may have an image format such as Tagged Image File Format (TIFF) or some other commonly used file format (e.g., portable document format). Depending upon the file format, the digital file may or may not have the text associated with the image. Where necessary, an OCR engine can be utilized to process the digital file to extract text from the image contained in the digital file.

Most commercially available OCR engines can be configured to also return the location information (e.g., word and character coordinate positions) of the text found on the image.

In embodiments disclosed herein, this location information is utilized (e.g., by subsystem 150 of platform 170) to generate an on-image navigation guide. This on-image navigation guide is then presented on a display screen over the image of the document for which the on-image navigation guide is constructed. A user interacts with the image, as guided by the on-image navigation guide. As the user navigates the image through the on-image navigation guide, table data contained in the image is entered, cell by cell, into corresponding fields of a table residing in a data storage. As explained below, the on-image navigation allows the user to make corrections and/or adjustments of the automatic data entries directly on the image. The on-image navigation does not require, but allows, the user to make corrections and/or adjustments of the automatic data entries in the data fields.

Figure 3:
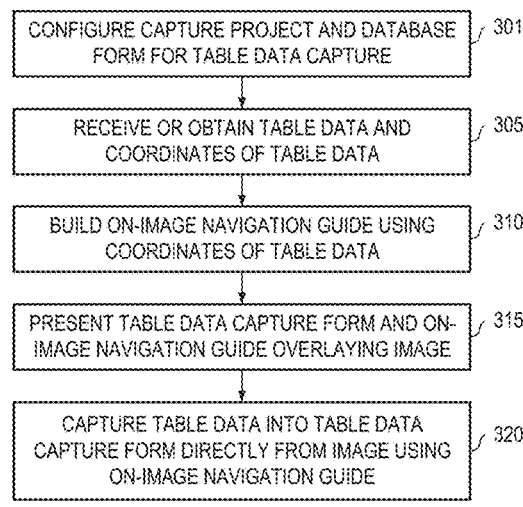
FIG. 3 is a flow chart illustrating an example of a method of on-image navigation and direct image-to-data storage table data capture according to some embodiments.

FIG. 3 is a flow chart illustrating an example of a method of on-image navigation and direct image-to-data storage table data capture according to some embodiments. Method 300 can begin with configuring a capture project, including a form to be used for table data capture (301). The capture project can be created through an application hosted by platform 170 described above. This configuration can be based on document types. For instance, a capture project can be configured to capture invoices having a certain number of columns. While the number of rows can be left undefined, the number of columns is specified so that the form can be configured with corresponding columns for capturing data (e.g., numerical and/or textual) in the table columns contained in the invoices (or, more precisely, contained in the images of the invoices).

Next, the system receives or obtains (e.g., from an OCR engine), for each image, the table data contained therein and coordinates of where the table data can be found in the image (305). For instance, the OCR engine can provide a bounding box defined by XY coordinates for each word or character found in a document image. The system utilizes these coordinates to build a presentation layer for on-image navigation (310).

In some embodiments, this presentation layer, referred to herein as an on-image navigation guide, can be rendered on a display screen as a grid that overlays the document image for which it is constructed (315). Each on-image navigation guide is specific to a document image because it is created using the coordinate positions of words and/or characters found in that document image. The data entry form, however, is not specifically configured to accommodate the document image. Rather, it is configured based on the document type of the document image which, in turn, is associated with the number and/or type of columns that can be found in the type of the document image (e.g., invoices having seven columns, purchase orders having four columns, etc.).

Figure 5A:
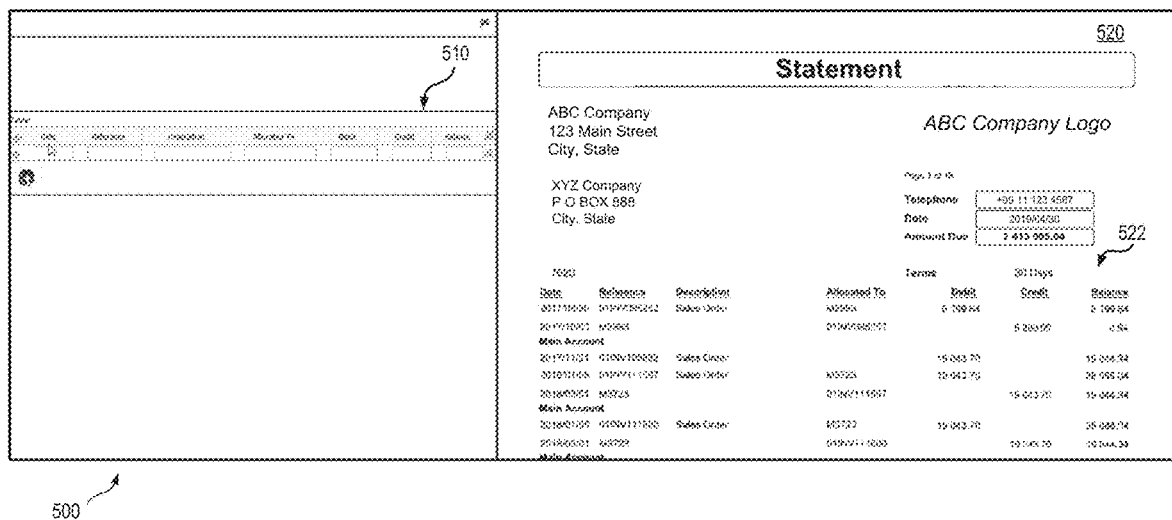
FIGS. 5A-5N depict diagrammatic representations of a user interface of a system for on-image navigation and direct image-to-data storage table data capture according to some embodiments.

With the data entry form configured and presented on the display screen together with the on-image navigation guide overlaying the document image, a user can begin to capture data into data fields by navigating the document image directly (320). FIG. FIG. 5A depicts a diagrammatic representation of a user interface 500 of a system for on-image navigation and direct image-to-data storage table data capture according to some embodiments. In this example, a document image 520 is shown on the right side of user interface 500 and a data entry form is shown on the left side of user interface 500. Document image 520 contains a table 522 which has a plurality of columns. Data entry form 510 is configured with the same number of columns.

Data entry form 510 provides a visual feedback of what data is captured in a physical data storage. However, data entry form 510 is not a database in a technical sense. The data fields (as they can be seen in FIGS. 5A-5N on the left side) shown on a display screen do not necessarily represent or are correlated to any database forms and fields. The physical storage of the captured data could be any appropriate data storage, for instance, an XML file, a spreadsheet, a JSON file, a table, a database, etc. This physical data storage is only a temporary storage for the duration of the capture process. In a subsequent exporting step, the data thus captured by a system disclosed herein is communicated to a subsequent computing facility or facilities for further processing.

Figure 5B:
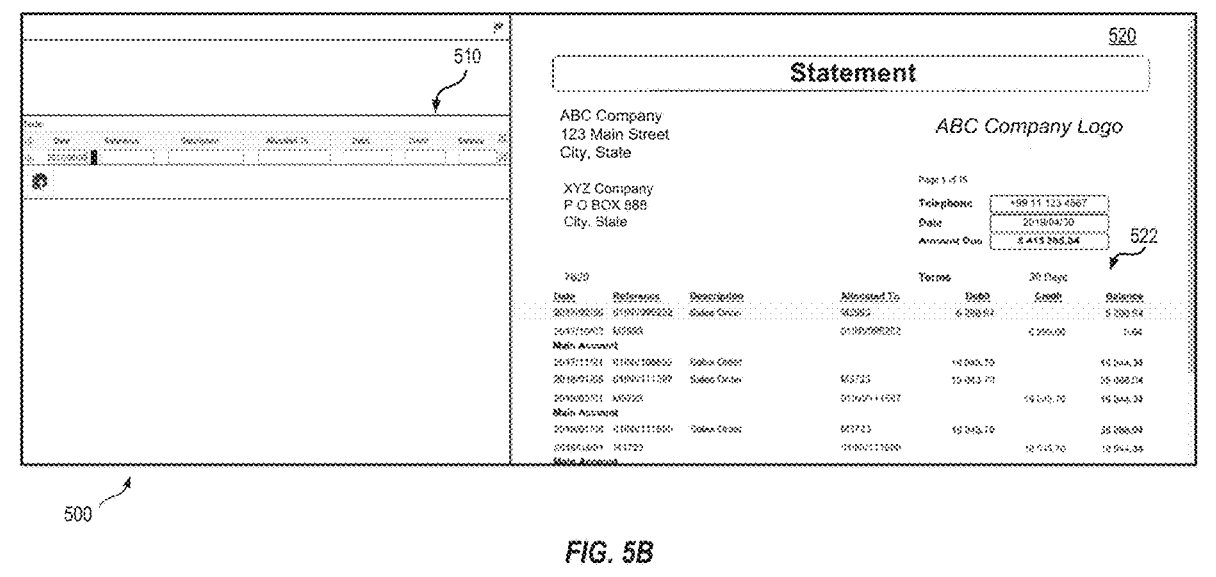

As a non-limiting example, the system may default a focus point to the first table cell (which can correspond to a bounding box of a piece of data found at that position) of a table shown in the document image. As illustrated in FIG. 5A, initially, data entry form 510 is empty and nothing is highlighted on document image 520. When the user hovers over an area of table 522 in document image 520, the system may respond by highlighting the area with a focus point located at the first table cell. For example, as illustrated in FIG. 5B, when the user hovers over a row of table 522, the row is highlighted and the first table cell is indicated as an initial focus point.

Figure 5C:
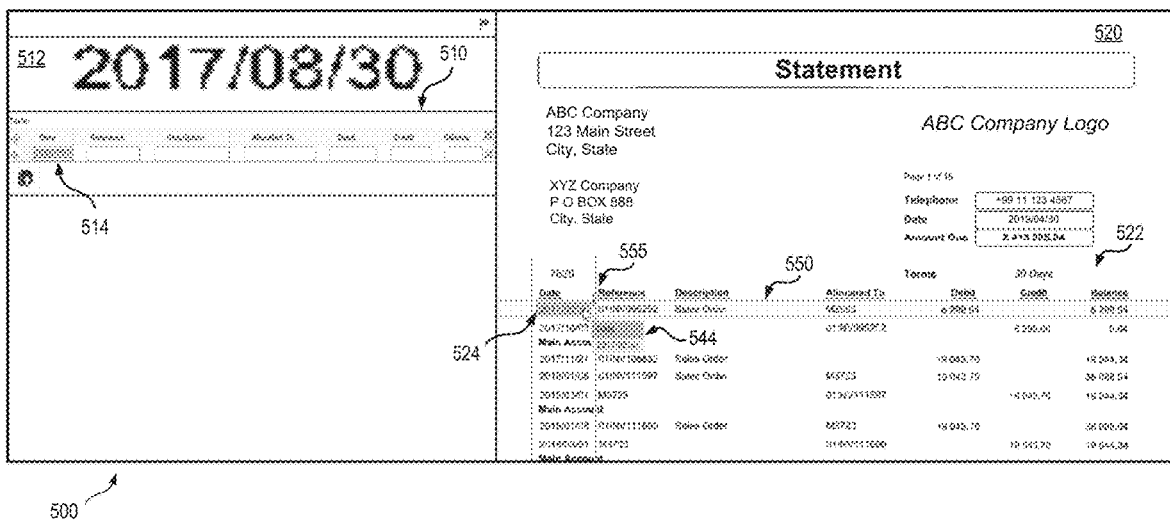

In embodiments disclosed herein, when the user clicks or otherwise interacts with document image 520, an on-image navigation guide is presented over document image 520. In FIG. 5C, an embodiment of an on-image navigation guide 550 is shown overlaying document image 520. When starting to capture from scratch, no columns are known yet. The user can change the column for which he is capturing a value by scrolling the mouse wheel. This is a necessary feature for some situations, when else he would have to switch to the data entry form. In this example, on-image navigation guide 550 has a set of vertical lines and a set of horizontal lines that form a grid-like appearance. The set of vertical lines corresponds to a column in table 522 and the set of horizontal lines corresponds to a row in table 522. The intersection of the set of vertical lines and the set of horizontal lines corresponds to a bounding box which, in turn, corresponds to a table cell 524. In this example, the pixel content of the bounding box is shown in an area 512 above data entry form 510 and the value of the pixel content is shown in inspection window 544. This provides a visualization of what the system has captured from the location of table cell 524. Further, in this example, the system utilizes a pin 555 to visually indicate that the current focus point is on table cell 524. Using the coordinates of the bounding box corresponding to the current focus point (which, in this example, is table cell 524), the system can retrieve the data extracted from within the bounding box and populate a data field 514 with the extracted data.

In some embodiments, the system can populate a data field with the extracted data found at a certain coordinate position of a document image using the following data structures. In some embodiments, the system utilizes these data structures to store data for images as well as data entry forms. This allows data captured from an image to be matched to a data entry form. Accordingly, these data structures can be referred to as unified data structures, universal data structures, or common data structures.

```
export class TableData {
    tableID: string; // The name of the table (provided by the
    project setup)
        rows: TableRowData[ ] = [ ]; // The (unlimited) number of
        rows in the table
}
export class TableRowData {
    cells: FieldData[ ] = [ ]; // The list of cells in one row.
                   // Corresponds to the fixed list of
                   columns, as provided by the project
                   setup
}
export class FieldData {
    name: string; // Here (for table cells): The column name
    value: string; // The field value
    errorStatus: ErrorStatus; // Error information for the
    cell, when erroneous
        captureZone: CaptureZone; // Zone information for this
    field
}
export class CaptureZone {
    rectangle: Rectangle; // Carries the coordinates on the
    image
        pageID: string; // A pointer to the respective image
}
export class Rectangle {
    x: number = 0; // Position, width and height of the field's
    zone
        y: number = 0;
        width: number = 0;
        height: number = 0;
}
export class ErrorStatus {
    hasError: boolean = false // Error information
    errorMessage: string;
}
```

The user can use the on-image navigation guide to change focus (of which data field to populate). As the user navigates the table (e.g., from column to column, from row to row, etc.), the focus point of the on-image navigation guide moves with the user, allowing the system to repeatedly and continuously correlate a table cell on the document image with a field of the data entry form. This is illustrated in FIG. 5D.

Figure 5D:
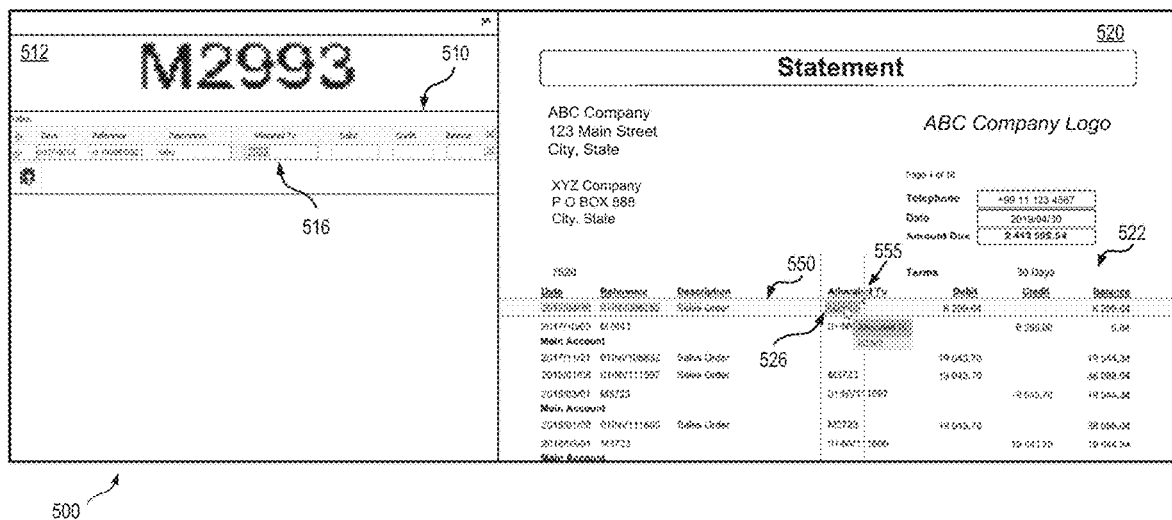

In the example of FIG. 5D, the user has moved to the fourth column of table 522. Correspondingly, the focus point, indicated by pin 555, of on-image navigation guide 550 is moved to a table cell 526 located at the fourth column of table 522. Again, the pixel content of the bounding box corresponding to table cell 526 is shown in area 512 above data entry form 510 and data extracted from within the bounding box is entered into a corresponding fourth data field 516 of data entry form 510.

Figure 5E:
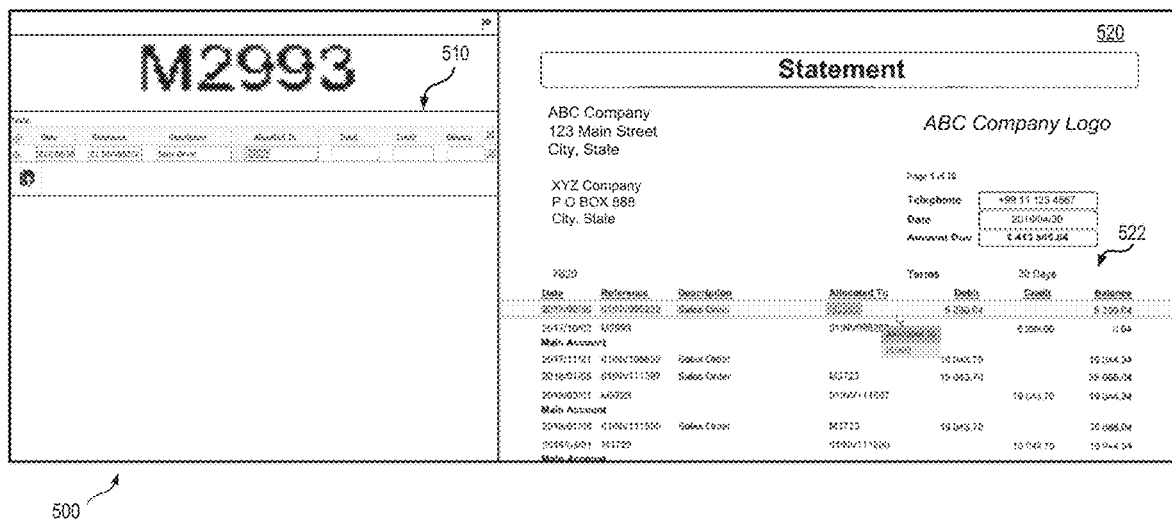

FIG. 5E shows a different visualization of on-image navigation guide 550. In this example, the vertical (column) lines and pin 555 of on-image navigation guide 550 are not visible. This can occur when the cursor or pointing device is transitioning (e.g., from column to column) between table cells that contain actual table data. In the example of FIG. 5E, the cursor or pointing device is transitioning between the fourth ("Allocated TO") and the fifth ("Debit") columns of table 522 where there is no table data to be captured. Thus, only the horizontal (row) lines are shown. Suppose the user just captured the "Debit" column (and not the "Allocated To" column), and now moves the mouse to the right of the "Debit" column, the focus in the data entry form would switch to the "Credit" column (as this is the next one), and the tooltip (the pointer) would also display "Credit" in its header of the inspection window. However, as shown in FIG. 5E, the "Credit" column is empty in the first row on document image 520. Thus, the "Balance" column should be captured next. To change the column, the user can scroll the mouse wheel, which will change the tooltip header to "Balance" (not shown). The focus in the data entry form will switch accordingly (which is represented by a highlighted frame around a corresponding data field, as illustrated in FIG. 5E), and the user can now capture the "6299.64" value for this column. Changing the column by mouse wheel can also be useful when columns overlap.

Figure 5F:
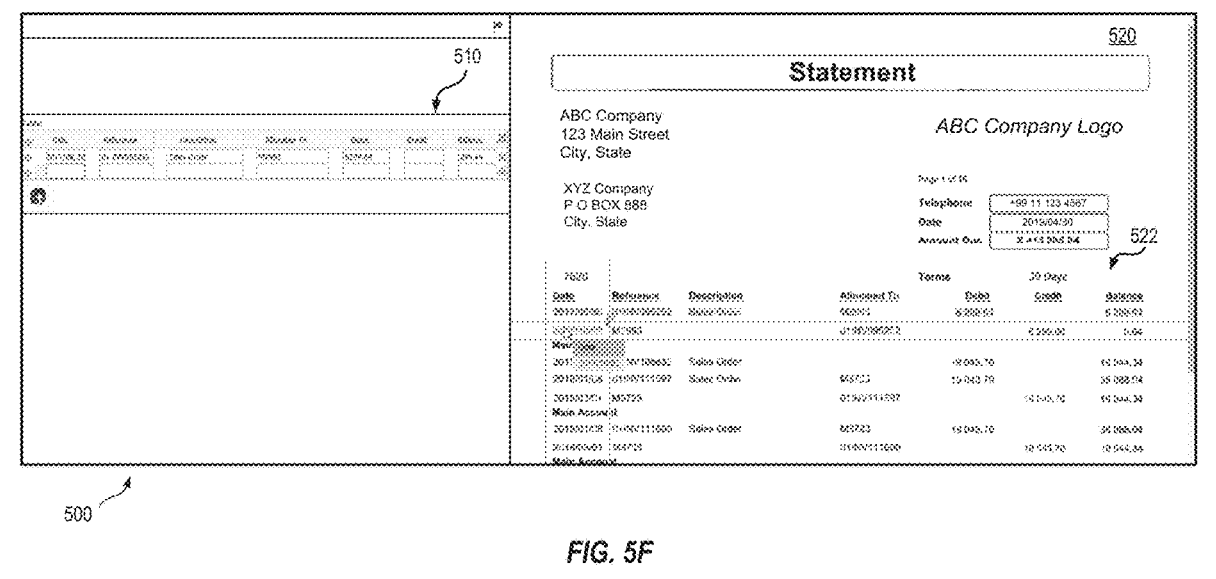

To capture table data row by row, the user can directly navigate to the next row shown on document image 520 (e.g., by selecting, or hovering over on-image navigation guide 550), as shown in FIG. 5F, without having to interact with data entry form 510. The user's movement through the cursor or pointing device instructs the system to move up, down, left, or right to the current focus point of on-image navigation guide 550 and, correspondingly, to move up, down, left, or right to the current field in data entry form 510. When moving downwards, if a row does not already exist in data entry form 510, the system automatically creates one. This way, the user no longer has to move back and forth between a document image and the data entry form, even if a corrected or adjustment is needed during capturing.

Figure 4:
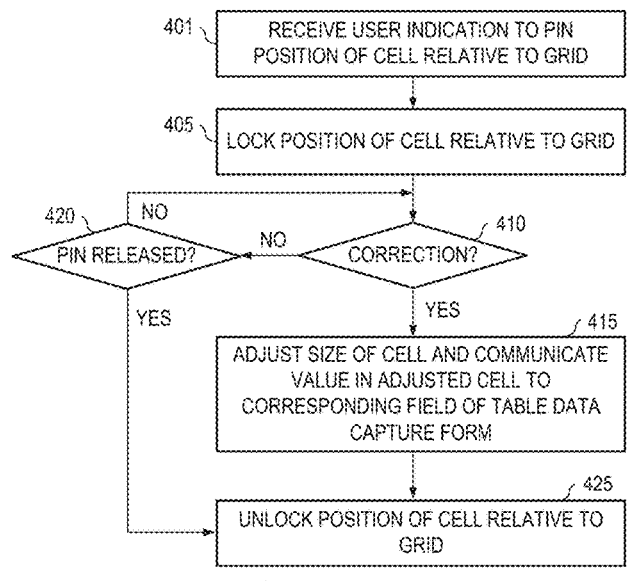
FIG. 4 is a flow chart illustrating an example of a method of on-image navigation that utilizes a pin to help capturing data outside the current focus point according to some embodiments.

In some embodiments, a correction or adjustment can be made by using a pin to fix the position of a table cell. FIG. 4 is a flow chart illustrating an example of a method of on-image navigation that utilizes a pin to help capturing data outside the current focus point according to some embodiments. In some cases, corrections and/or adjustments maybe needed in how the system automatically extracts table data and populates data fields accordingly. As discussed above, the system is configured with the column information (e.g., the number of columns in a type of document image to be processed). The system obtains the width information for each column from the coordinates of bounding boxes of all cells of this particular column which were already captured. The width of the column is the maximum width of all these cells; it will be re-calculated whenever a new cell is captured. Column widths reflect the outcome of what was captured so far. When capturing a new cell, the actual column width may be too narrow, if the width of this cell is larger than what was already captured for this column.

Figure 5G:
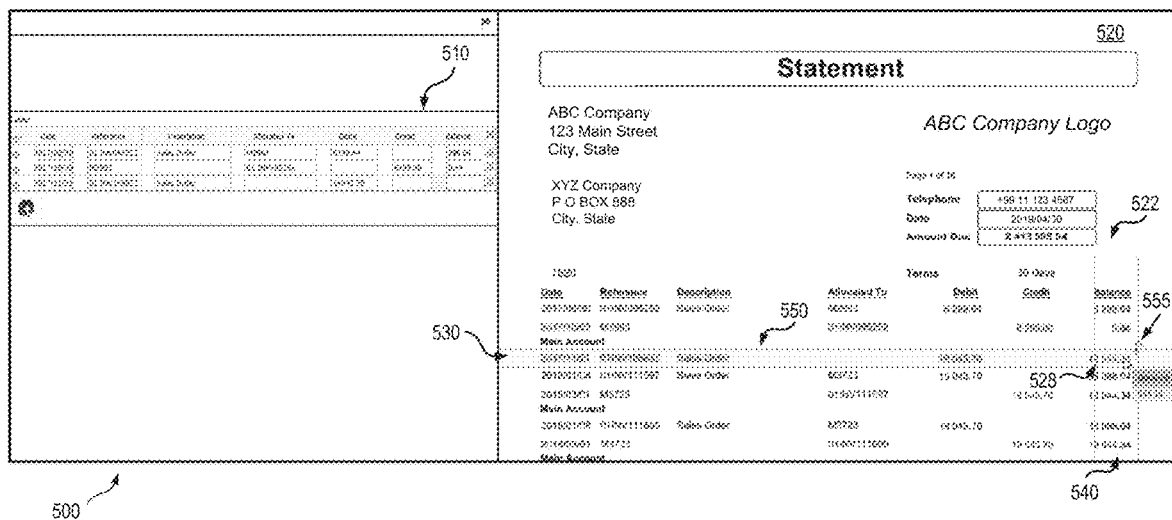

For example, FIG. 5G shows on-image navigation guide 550 overlaying table 522, with pin 555 representing a current focus point at the intersection of a row 530 and a column 540 of table 522. In this example, the vertical lines of on-image navigation guide 550 were initially defined based on the width of the table cells above the current one in column 540. The second table cell in column 540 has a width that is narrower than the width of the first table cell in column 540. Thus, its value is correctly captured into data entry form 510 and no adjustment is needed. However, a third table cell 528 in column 540 is wider than the table cells before it in the same column (e.g., has a numerical value that is larger than the numerical values in the table cells above it). This exemplifies a scenario in which an adjustment of on-image navigation guide 550 is needed so that data can be correctly captured into corresponding data fields in data entry form 510.

Figure 5H:
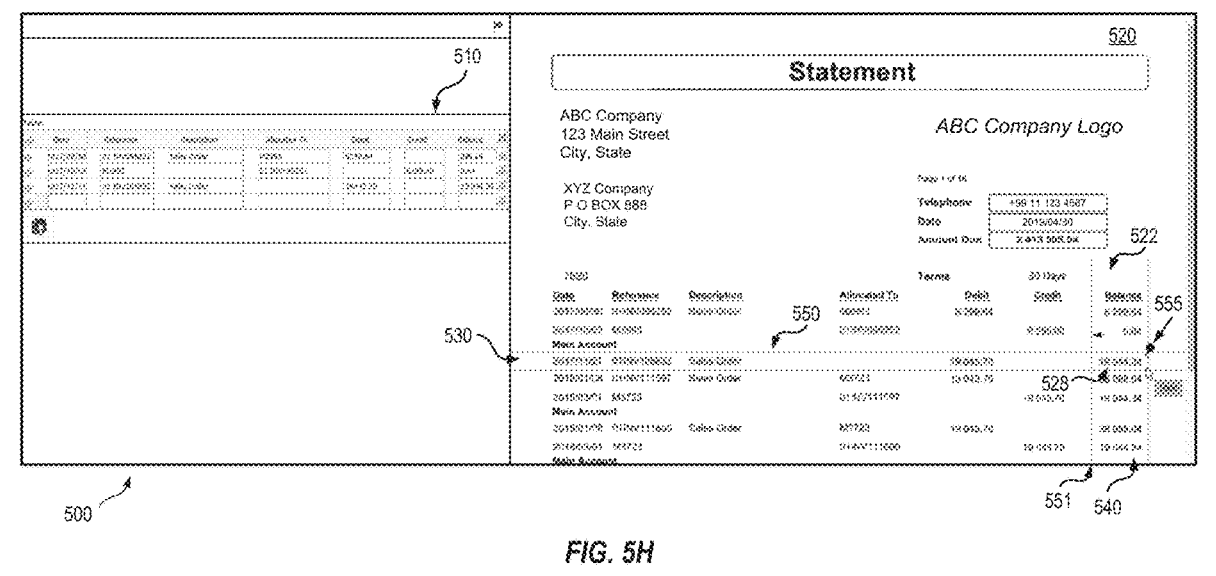

Referring to FIG. 4, accordingly, method 400 can begin with the system receiving an indication that a user wishes to pin or fix the position of a table cell relative to an on-image navigation guide, referred to in FIG. 4 as a grid (401). The user does not actively enlarge or change the column widths. As shown in FIG. 5H, as an example, the user can select or click on pin 555 to help the system capture the correct data. Responsively, the system can change the color, shade, and/or shape of pin 555 to indicate that pin 555 (and its corresponding table cell 528) is now "locked" or "fixed" relative to on-image navigation guide 550 (405). In this case, the user can move the mouse "outside" the current focus point (410) without losing it, and capture the value (415). Immediately after capturing, pin 550 automatically gets "unlocked" (425), and the column width will be recalculated, taking the new cell into account, i.e., it will be larger afterwards. If no change is made (410), pin 550 is released (420).

Figure 5I:
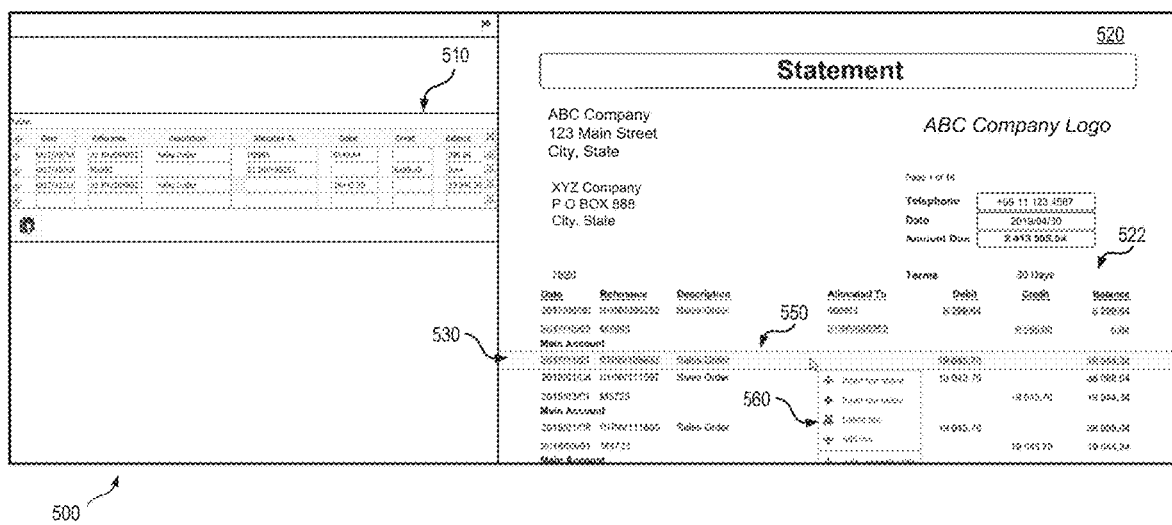
Figure 5J:
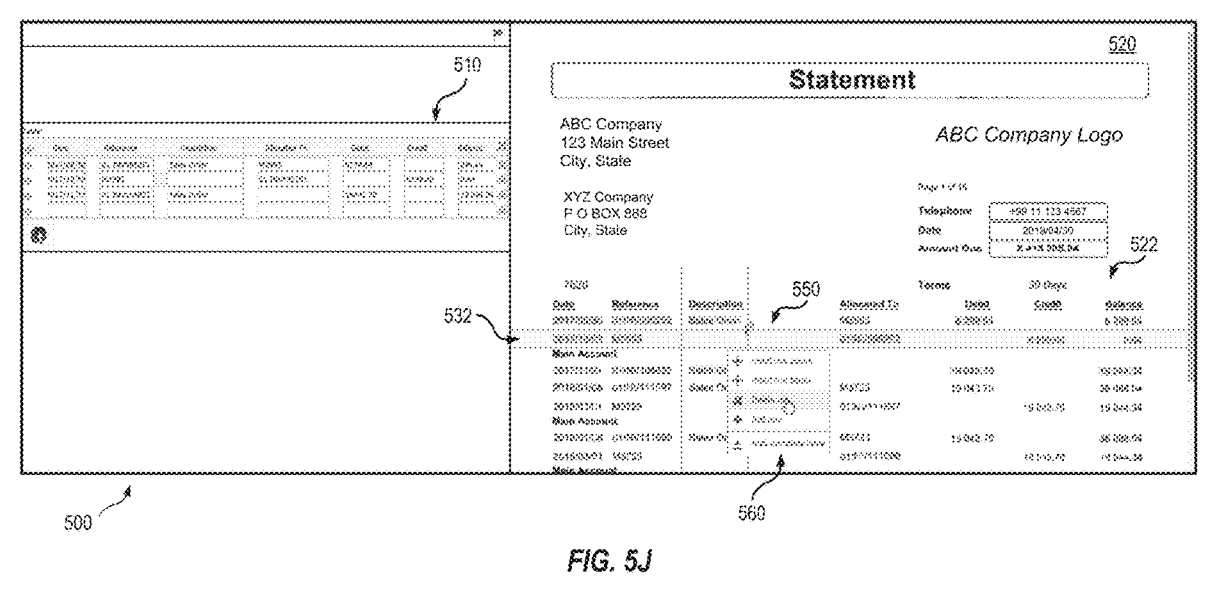
Figure 5K:
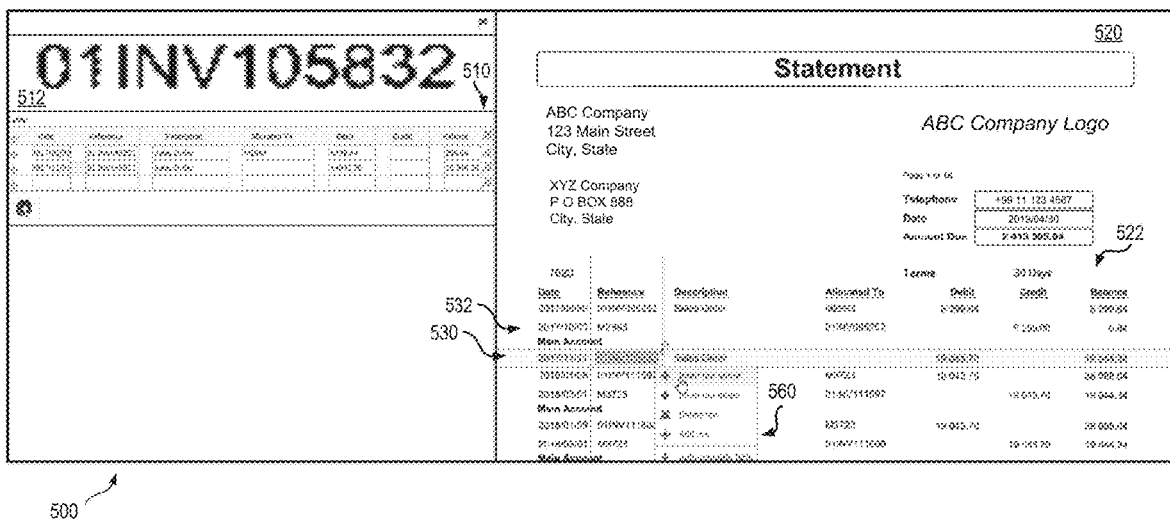

In some embodiments, the on-image navigation guide disclosed herein can include an on-image context menu for on-image edit of corresponding rows. For example, FIG. 5I shows an on-image context menu 560 which a user can access by right-clicking anywhere on on-image navigation guide 550. Referring to FIG. 5J, to delete row 532, the user can select "Delete row" from on-image context menu 560 while row 532 is highlighted or selected. FIG. 5K shows that row 532 is still part of table 522 in document image 520. However, a corresponding row in data entry form 510 is now deleted. In this case, the system automatically moves to the next starting point to capture data from the next row (row 530 in this example). As shown in FIG. 5K, the deleted row can again be inserted into data entry form 510 by accessing on-image context menu 560 from within on-image navigation guide 550 and selecting "Insert row above" from on-image context menu 560. Through on-image navigation guide 550, all of these edits can be performed directly on the document image. The user can, but does not need to, interact with data entry form 510 to make these changes.

Figure 5L:
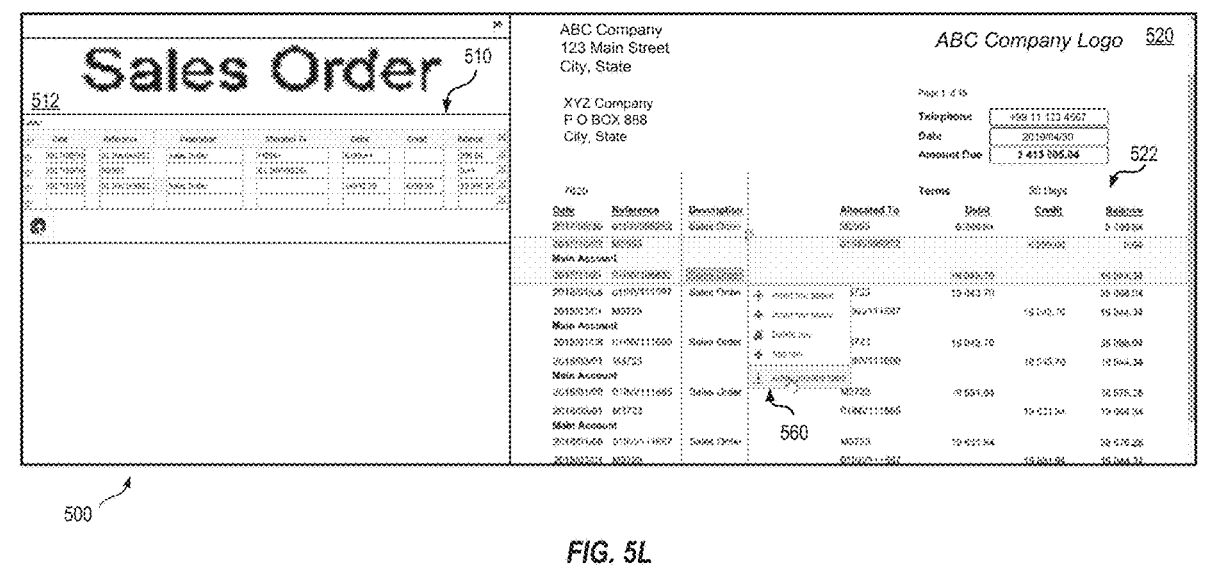

As shown in FIG. 5L, on-image context menu 560 can include an auto-complete table function that allows the system to automatically complete data entry form 510. The auto-complete table function can be realized with a machine learning model implementing a table auto-completion (TAC) algorithm. The model is continuously adapted through on-the-fly training, with as few as a negative example, to perform TAC on the client side, one document at a time. Knowledge thus learned by the model can be used to improve a global model on the server side. The global model can be utilized to automatically and intelligently extract table information from a large number of documents with significantly improved accuracy, requiring minimal human intervention even on complex tables. Additional details and examples can be found in U.S. Pat. No. 10,241, 992, entitled "TABLE ITEM INFORMATION EXTRACTION WITH CONTINUOUS MACHINE LEARNING THROUGH LOCAL AND GLOBAL MODELS," which is fully incorporated by reference herein for all purposes.

Figure 5M:
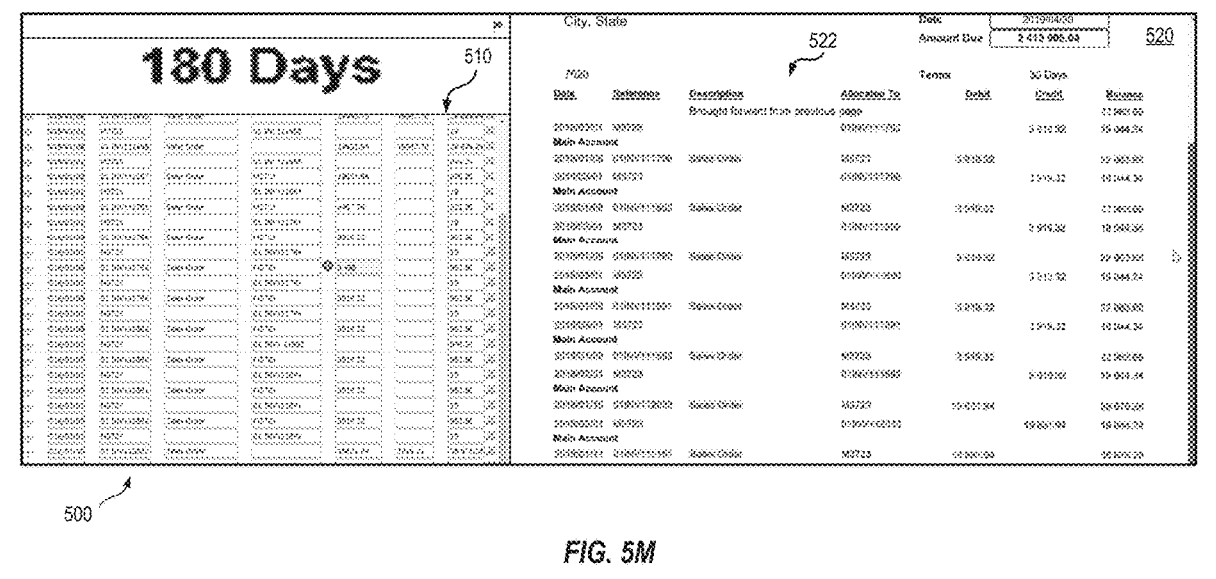
Figure 5N:
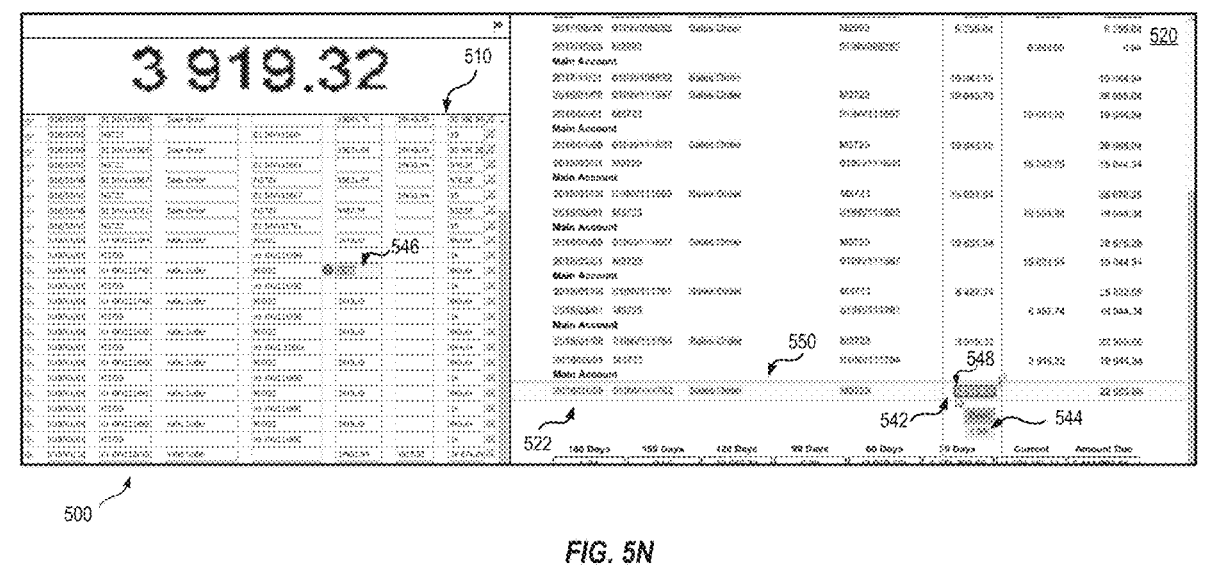

FIG. 5M shows that, after the auto-complete table function is applied through on-image context menu 560, data entry form 510 can be automatically populated with data extracted from table 522 on document image 520. In this example, the system has detected a potential error in a data field (e.g., a character is found in a numerical field). Should the user decide that this is indeed an error that should be corrected, the user can do so directly on document 520. As illustrated in FIG. 5N, this kind of direct on-image correction is made possible through on-image navigation guide 550. As before, the user can navigate to a table cell of interest (e.g., table cell 542). Initially, when table cell 542 is selected through on-image navigation guide 550 as the current focus point, a corresponding inspection window 544 shows the captured value which, in this case, is the incorrectly recognized value that was captured and used to populate a corresponding data field 546. The user can manipulate a selection box 548 within table cell 542. In one embodiment, selection box 548 can serve as a bounding box for a value contained in table cell 542. The system is operable to extract this value from selection box 548 and populate data field 546 with the extracted value to thereby replace the incorrect recognition result previously entered in data field 546 with the correct value that the user has indicated through on-image navigation guide 550. In one embodiment, an input field of inspection window 544 within on-image navigation guide 550 can be activated to allow the user to input a correct or replacement value for data field 546. As a non-limiting example, this input field can be activated through a function key (e.g., "F2").

In this way, on-image navigation guide 550 can provide a very convenient way for a user to view which field is not captured/recognized correctly (e.g., from a current or previous recognition process) and correct/alter directly on a document image. Because capture and corrections can be done on document images with immediate, direct visual feedback, the user does not need to interact with a data entry form. Further, on-image navigation guide 550 can be utilized to capture table data from scratch (e.g., FIG. 5C) or from a previous recognition process (e.g., FIG. 5N). That is, the ability for a user to alter captured/recognized values in data fields directly on a document image does not depend on whether a recognition process has already applied to the document image. The user can use an on-image navigation guide disclosed herein to capture table data from a document image from scratch (i.e., a corresponding data entry form is initially empty) and/or to review/correct table data captured from a document image through a previous recognition process.

The on-image navigation guide can provide many advantages. For example, with the on-image navigation guide, a user no longer needs to interact with a data entry form for manual entry/correction and can navigate a document image and perform necessary review/correction directly on the document image. Further, the on-image navigation guide provides immediate visual feedback and combines single entry and table auto-completion functionalities. As a result, errors can be caught early and time needed to correct tables can be significantly reduced.

Figure 6:
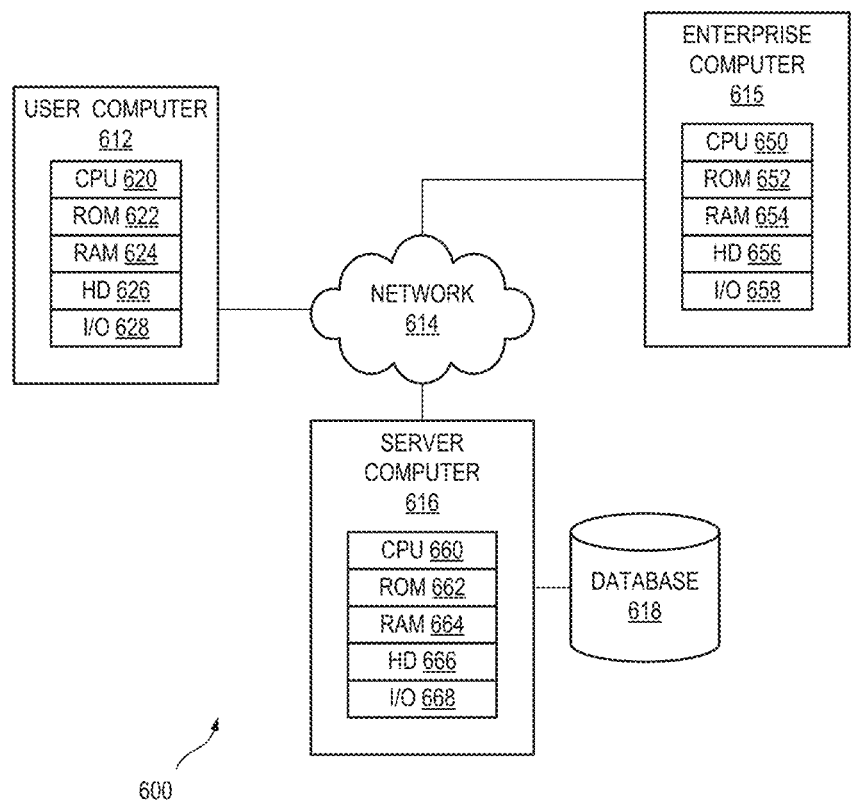
FIG. 6 depicts a diagrammatic representation of an example of an enterprise computing environment where embodiments disclosed can be implemented.

FIG. 6 illustrates an exemplary architecture for enterprise computing environment 600 that includes network 614 that can be bi-directionally coupled to user computer 612, enterprise computer 615, and server computer 616. Server computer 616 can be bi-directionally coupled to data storage 618. Network 614 may represent a combination of internal and external networks that enterprise computing environment 600 may utilize for various types of network communications known to those skilled in the art.

For the purpose of illustration, a single system is shown for each of user computer 612, enterprise computer 615, and server computer 616. However, within each of user computer 612, enterprise computer 615, and server computer 616, a plurality of computers (not shown) may be interconnected to each other over network 614. For example, a plurality of user computers 612 and a plurality of enterprise computers 615 may be coupled to network 614. User computers 612 may run an embodiment of the on-image navigation guide disclosed herein. Server computer 616 may host an application that provides the on-image navigation guide to user computers 612. Enterprise computers 615 may provide document images to server computer 616.

User computer 612 can include central processing unit ("CPU") 620, read-only memory ("ROM") 622, random access memory ("RAM") 624, hard drive ("HD") or storage memory 626, and input/output device(s) ("I/O") 628. I/O 628 can include a keyboard, monitor, printer, electronic pointing device (e.g., mouse, trackball, stylus, etc.), or the like. User computer 612 can include a desktop computer, a laptop computer, a personal digital assistant, a cellular phone, or nearly any device capable of communicating over a network. Enterprise computer 615 may be similar to user computer 612 and can comprise CPU 650, ROM 652, RAM 654, HD 656, and I/O 658.

Likewise, server computer 616 may include CPU 660, ROM 662, RAM 664, HD 666, and I/O 668. Server computer 616 may include one or more backend systems employed by an enterprise to process information in enterprise computing environment 600. Processed information can be stored in a database management system as associated with data storage 618. Many other alternative configurations are possible and known to skilled artisans.

Each of the computers in FIG. 6 may have more than one CPU, ROM, RAM, HD, I/O, or other hardware components. For the sake of brevity, each computer is illustrated as having one of each of the hardware components, even if more than one is used. Each of computers 612, 615, and 616 is an example of a data processing system. ROM 622, 652, and 662; RAM 624, 654, and 664; HD 626, 656, and 666; and data storage 618 can include media that can be read by CPU 620, 650, or 660. Therefore, these types of memories include non-transitory computer-readable storage media. These memories may be internal or external to computers 612, 615, or 616.

Portions of the methods described herein may be implemented in suitable software code that may reside within ROM 622, 652, or 662; RAM 624, 654, or 664; or HD 626, 656, or 666. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a non-transitory computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved in many ways. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine-readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for on-image navigation and direct image-to-data storage table data capture, the method comprising:
   receiving or obtaining, by a computer from a recognition engine, positions of table data of a table in a document image processed by the recognition engine;
   generating, by the computer, an overlay using the positions of the table data found by the recognition engine in the document image;
   presenting, by the computer, a data entry form, the document image, and the overlay on a display screen, the overlay overlaying the document image on the display screen, the overlay having a focus corresponding to a table cell on the document image;
   receiving, responsive to a user navigating the overlay overlaying the document image, a user indication to select the focus to correspond to a selected table cell on the document image;
   automatically determining, by the computer, a field of the data entry form that corresponds to the selected table cell on the document image based on a correlation between a location of the selected focus and the overlay overlaying the document image; and
   populating, by the computer, the determined field of the data entry form with a value from the selected table cell on the document image.

2. The method according to claim 1, further comprising:
   receiving a user indication to adjust the focus in position relative to the overlay;
   fixing the focus in position relative to the overlay, exiting a capture mode, and entering an edit mode; and
   in the edit mode, receiving an instruction through the overlay on the display and adjusting a position of a guideline of the overlay according to the instruction, the adjusting changing a width of a bounding box used to capture the value from the table cell on the document image.

3. The method according to claim 2, wherein the user indication comprises a selection of a pin on the overlay for the table cell on the document image.

4. The method according to claim 1, wherein the overlay comprises one or more bounding boxes and wherein the focus represents a position of one of the one or more bounding boxes.

5. The method according to claim 1, wherein the overlay comprises at least one of an on-image context menu, a pin, or an inspection window.

6. The method according to claim 5, further comprising:
receiving, through the on-image context menu of the overlay overlaying the document image, an instruction to delete a row from or insert a row into the data entry form.

7. The method according to claim 1, wherein the data entry form is configured with same number of columns as the table and wherein the document image and the data entry form share same data structure.

8. A system for on-image navigation and direct image-to-data storage table data capture, the system comprising:
a processor;
a non-transitory computer-readable medium; and
stored instructions translatable by the processor for:
receiving or obtaining, from a recognition engine, positions of table data of a table in a document image processed by the recognition engine;
generating an overlay using the positions of the table data found by the recognition engine in the document image;
presenting a data entry form, the document image, and the overlay on a display screen, the overlay overlaying the document image on the display screen, the overlay having a focus corresponding to a table cell on the document image;
receiving, responsive to a user navigating the overlay overlaying the document image, a user indication to select the focus to correspond to a selected table cell on the document image;
automatically determining a field of the data entry form that corresponds to the selected table cell on the document image based on a correlation between a location of the selected focus and the overlay overlaying the document image; and
populating the determined field of the data entry form with a value from the selected table cell on the document image.

9. The system of claim 8, wherein the stored instructions are further translatable by the processor for:
receiving a user indication to adjust the focus in position relative to the overlay;
fixing the focus in position relative to the overlay, exiting a capture mode, and entering an edit mode; and
in the edit mode, receiving an instruction through the overlay on the display and adjusting a position of a guideline of the overlay according to the instruction, the adjusting changing a width of a bounding box used to capture the value from the table cell on the document image.

10. The system of claim 9, wherein the user indication comprises a selection of a pin on the overlay for the table cell on the document image.

11. The system of claim 8, wherein the overlay comprises one or more bounding boxes and wherein the focus represents a position of one of the one or more bounding boxesfocus.

12. The system of claim 8, wherein the overlay comprises at least one of an on-image context menu, a pin, or an inspection window.

13. The system of claim 12, wherein the stored instructions are further translatable by the processor for:
receiving, through the on-image context menu of the overlay overlaying the document image, an instruction to delete a row from or insert a row into the data entry form.

14. The system of claim 8, wherein the data entry form is configured with same number of columns as the table and wherein the document image and the data entry form share same data structure.

15. A computer program product for on-image navigation and direct image-to-data storage table data capture, the computer program product comprising a non-transitory computer-readable medium storing instructions translatable by a processor for:
receiving or obtaining, from a recognition engine, positions of table data of a table in a document image processed by the recognition engine;
generating an overlay using the positions of the table data found in the document image by the recognition engine;
presenting a data entry form, the document image, and the overlay on a display screen, the overlay overlaying the document image on the display screen, the overlay having a focus corresponding to a table cell on the document image;
receiving, responsive to a user navigating the overlay overlaying the document image, a user indication to select the focus to correspond to a selected table cell on the document image;
automatically determining a field of the data entry form that corresponds to the selected table cell on the document image based on a correlation between a location of the selected focus and the overlay overlaying the document image; and
populating the determined field of the data entry form with a value from the selected table cell on the document image.

16. The computer program product of claim 15, wherein the instructions are further translatable by the processor for:
receiving a user indication to adjust the focus in position relative to the overlay;
fixing the focus in position relative to the overlay, exiting a capture mode, and entering an edit mode; and
in the edit mode, receiving an instruction through the overlay on the display and adjusting a position of a guideline of the overlay according to the instruction, the adjusting changing a width of a bounding box used to capture the value from the table cell on the document image.

17. The computer program product of claim 16, wherein the user indication comprises a selection of a pin on the overlay for the table cell on the document image.

18. The computer program product of claim 15, wherein the overlay comprises one or more bounding boxes and wherein the focus represents a position of one of the one or more bounding boxes focus.

19. The computer program product of claim 15, wherein the overlay comprises at least one of an on-image context menu, a pin, or an inspection window.

20. The computer program product of claim 15, wherein the instructions are further translatable by the processor for:

receiving, through the on-image context menu of the overlay overlaying the document image, an instruction to delete a row from or insert a row into the data entry form.

\* \* \* \* \*